3,189,433
METHOD OF AGGLOMERATING PHOSPHATE MATERIAL
Clinton A. Hollingsworth and Jack J. Lewis, Lakeland, Fla., assignors, by mesne assignments, to The Borden Company, a corporation of New Jersey
No Drawing. Filed June 11, 1962, Ser. No. 201,269
2 Claims. (Cl. 71—37)

This invention relates to the formation of agglomerates of fluorine-containing phosphatic materials suitable for use as defluorination feed material, and more particularly it relates to the formation of non-hygroscopic agglomerates of phosphate materials which are capable of being stored indefinitely, which have sufficient mechanical strength to be screened and to withstand calcination in a rotary kiln without appreciable physical disintegration and which are capable of being defluorinated by heating in the presence of water vapor and without fusion at a temperature of at least 2200° F.

U.S. Patent No. 2,995,436, granted August 8, 1961, to Clinton A. Hollingsworth and William A. Kirkland, describes a method of forming porous nodules of fluorine-containing phosphate material which are capable of being calcined in the presence of water vapor and without fusion at a temperature of at least 2300° F. to obtain a defluorinated phosphate product having high fertilizer availability. In the patented process unground phosphate rock having a silica content of from 2 to 6% by weight is mixed with specified quantities of soda ash and an aqueous solution of phosphoric acid, the rock preferably being mixed with the soda ash before adding the phosphoric acid thereto. The moisture content of the mixture is then adjusted so that it contains between 10 to 20% by weight of water, and the resulting moist mixture is nodulized, preferably in a rotating disk-type nodulizer, to obtain wet-appearing nodules that may be fed directly to the defluorinating kiln or that may be dried in suitable drying apparatus for storage prior to calcination. The nodules formed by the patented process are readily defluorinated, but these nodules do not possess optimum physical characteristics. That is to say, the nodules are wet in appearance and to the touch when first produced and do not become dry unless subjected to a supplementary drying operation. To make it possible to handle the wet nodules, the nodules must be coated with a dry powdery material, such as powdered coal or the like, or must be subjected to a drying operation to eliminate moisture therefrom. Moreover, the dried nodules are hygroscopic and cannot be stored indefinitely under normal conditions of storage without adsorbing moisture and ultimately reverting to the wet-appearing condition they have when first formed. In adidtion, the nodules formed by the patented process are not as mechanically strong as could be desired in that they cannot be screened for size classification without physical disintegration of a substantial portion of the nodules, and when the nodules are subjected to the tumbling action encountered in a rotary kiln there is considerable additional physical disintegration of the nodules with the formation of fine particles and accompanying dust losses.

We have now discovered an improved method of making nodules or agglomerates of fluorine-containing phosphatic material that are dry to the eye and to the touch shortly after being formed, that are not hygroscopic, that are capable of being stored indefinitely under ordinary conditions of storage, and that have sufficient mechanical strength to be screened and to withstand calcination in a rotary kiln without appreciable physical disintegration. Moreover, the nodules or agglomerates are formed from an agglomeration mixture (the preparation of which is hereinafter described) by means of a disk-type nodulizer or drum type equipment which form agglomerates by a tumbling action or by means of extrusion equipment which forms agglomerates by forcing the agglomeration mixture through a die, and the agglomerates so formed can be defluorinated by heating the agglomerates (under specified conditions) in a rotary kiln, in a fluidized bed reactor and in other high temperature defluorination equipment.

The non-hygroscopic, mechanically strong agglomerates produced by our new process are formed from an agglomeration mixture of a fluorine-containing phosphate material having a silica content of from 2 to 6% by weight, at least one acid phosphate compound selected from the group consisting of the phosphorus acids and their acid sodium salts, and at least one sodium compound selected from the group consisting of sodium carbonate, sodium bicarbonate, sodium hydroxide, sodium phosphates, sodium chloride, sodium sulfate and sodium nitrate. The agglomeration mixture is formed by adding to the fluorine-containing phosphate material at least one of the aforementioned acid phosphate compounds in an amount such that the added acid phosphate compound (calculated as $P_2O_5$) is between about 7 to 13% by weight on a dry basis of the final agglomeration mixture, followed by blending the two phosphate compounds together with sufficient water for a sufficient time to obtain a pasty reaction mix or product. At least one of the aforementioned sodium compounds is then added to the pasty reaction mix in an amount such that the added sodium compound (calculated as $Na_2O$) is between about 5 to 9% by weight on a dry basis of the final agglomeration mixture, followed by blending of the pasty reaction mix and sodium compound together to obtain a uniform, substantially homogeneous mixture. The moisture content of this homogeneous mixture is then adjusted by the addition or removal of water to obtain a final agglomeration mixture that contains between about 5 to 18% by weight of water. The final agglomeration mixture is then agglomerated in any desired manner to obtain agglomerates having the physical characteristics hereinbefore described.

The fluorine-containing phosphate material employed in the practice of our invention is usually the ground or unground product of a phosphate rock mill or concentrator having a typical average analysis of about 35% $P_2O_5$, about 50% CaO, about 4% fluorine, and about 2 to 6% insoluble matter consisting mainly of silica, and having a particle size of minus 10 mesh (Tyler standard) and preferably a major portion being between minus 14 and plus 150 mesh. The acid phosphate compounds useful in the practice of our invention are those which when mixed and thoroughly blended with the fluorine-containing phosphate material will react therewith to form a pasty reaction mix or product. We usually employ a crude commercial phosphoric acid obtained by reacting sulfuric acid with a phosphate bearing material, e.g. phosphate rock, and having a $P_2O_5$ content of 32% or higher, although other acid phosphate compounds such as the acidic sodium salts of the phosphorus acids can also be successfully employed. The sodium compounds useful in the practice of our invention include such sodium compounds as sodium carbonate, sodium bicarbonate, sodium hydroxide, sodium phosphates, sodium chloride, sodium sulfate and sodium nitrate, although we presently prefer to use commercial soda ash (or sodium carbonate).

The agglomeration mixture is prepared by adding at least one of the aforementioned acid phosphate compounds to the fluorine-containing phosphate material, the amount of the added acid phosphate compound (calculated as $P_2O_5$) being between about 7 to 13%, and preferably between 9 to 11%, by weight on a dry basis of the final agglomeration mixture. Some water should also be present to facilitate blending of the phosphate compounds, although the phosphate rock and phosphoric acid usually employed ordinarily contain sufficient water for this purpose without the addition of extra water to the mix. In fact, we presently prefer to use wet process phosphoric acid having a $P_2O_5$ content of 32% or higher to avoid adding excessive water to the mix which ultimately must be removed before agglomeration. The phosphate material and acid phosphate compound are then thoroughly blended together to promote reaction between the phosphate compounds, the blending operation being carried out in any suitable blending equipment such, for example, as a cement mixer-type blender, a pug mill or the like.

The blending operation is continued until the mix attains or passes through a plastic or soupy consistency that is referred to herein as the pasty reaction mix. When this plastic or soupy consistency is attained, but not before, one or more of the aforementioned sodium compounds is added to the pasty reaction mix, the amount of the added sodium compound (calculated as $Na_2O$) being between about 5 to 9%, and preferably between about 6 to 7%, by weight on a dry basis of the final agglomeration mixture. The blending operation is then continued until a substantially homogeneous mixture is obtained. The homogeneous mixture thus obtained is fairly free flowing, and if the moisture content of the mixture is less than about 15% by weight of water the mixture appears to be almost dry.

The homogeneous mixture can be introduced directly into the agglomerating equipment or can be stored for agglomeration at a later time. If the mixture is to be stored for a period of time before being agglomerated, it is advantageously dried to reduce the moisture content thereof. In any case, in order to form strong, non-hygroscopic agglomerates in accordance with our invention, the final agglomeration mixture should have a moisture content of between 5 to 18%, and preferably between 10 to 15%, by weight of water immediately prior to agglomeration, and if necessary the moisture content of the mixture should be adjusted by the addition or removal of water to obtain the required moisture content. The final agglomeration mixture is formed into agglomerates in conventional agglomerating equipment such, for example, as a drum type or disk type nodulizer, an extruder, a compacting and granulating mill, or the like. The agglomeration mixture can be heated to promote the formation of the agglomerates, although satisfactory agglomerates are formed without the addition of heat from external sources. The agglomerates appear moist when first formed but within a relatively short time the moistness disappears and the agglomerates become firm enough to withstand conveying and handling without any additional treatment (e.g. drying) thereof, although additional air drying of the agglomerates may sometimes be desirable. When properly made, the agglomerates continue to get harder and more resistant to attrition for hours and possibly days after manufacture. The unsized agglomerates can be conveyed directly to storage or they can be screened for size classification to obtain agglomerates of suitable size for defluorination feed, the undersize and oversize from the screening operation being returned to the blending operation.

The agglomerates produced in accordance with our new process are dry to the eye and to the touch shortly after being formed and do not absorb moisture when stored for an indefinite period prior to calcination. The agglomerates have sufficient mechanical strength to be screened and to withstand calcination in a rotary kiln without appreciable physical disintegration, and the agglomerates can be defluorinated by heating them in the presence of water vapor at a temperature of at least 2200° F. and below the incipient fusion temperature of the agglomerates (i.e. below about 2800° F.) in any suitable high temperature reaction equipment such as the rotary kiln or fluid bed reactor described in United States Patent 2,995,437 to Clinton A. Hollingsworth.

The following examples are illustrative but not limitative to the practice of our invention.

*Example I*

An agglomeration mixture was prepared from phosphate rock having a particle size of between minus 14 mesh and plus 150 mesh (Tyler standard) and containing about 35% $P_2O_5$, 4% fluorine and 4% silica by weight, wet process phosphoric acid containing about 32% $P_2O_5$ and commercial soda ash containing about 58% $Na_2O$, the composition of the agglomeration mixture on a dry basis being as follows:

| | Percent |
|---|---|
| Phosphate rock | 83.3 |
| Added $P_2O_5$ (from phosphoric acid) | 10.0 |
| Added $Na_2O$ (from soda ash) | 6.7 |
| | 100.0 |

To prepare the mixture, about 83.3 parts by weight of the phosphate rock and about 31.3 parts by weight of the phosphoric acid were first introduced into and thoroughly blended together in a cement mixer-type blender, the blending of the rock-and-acid mixture being continued for about 5 minutes or until the mixture had passed through a plastic or soupy stage to obtain a pasty reaction product or mix. About 10.3 parts by weight of the sodium compound were then added to the mix in the blender and the blending operation continued for about an additional five minutes to thoroughly blend the three components together and to obtain a homogeneous agglomeration mixture.

The agglomeration mixture when removed from the blender contained 12.4% by weight of water. Despite the moisture content of the mixture, the mixture was free-flowing and dry in appearance. The mixture was then introduced into a rotating screw-type extruder which forced the mixture through a die plate having a number of 3/16 inch holes formed therein. The extrusions thus produced were moist in appearance but within a few seconds became dry and increasingly firm and hard.

The extrusions were stored for 24 hours after which time they were found to contain about 10.4% by weight of water and to be quite hard. They were then defluorinated in a fluidized bed reactor to obtain a defluorinated phosphate product. The pertinent data with regard to the defluorination operation was as follows:

| | |
|---|---|
| Fuorine in extrusions (dry basis) _____percent__ | 3.4 |
| Feed rate of extrusions to fluid bed reactor (wet basis) _____lbs./hr.__ | 300 |
| Deflouination temperature _____°C__ | 2475 |
| Fluorine in extrusions after defluorination percent__ | 0.08 |

*Example II*

An agglomeration mixture was prepared in the same manner as described in Example I. The agglomeration mixture removed from the cement mixer-type blender was introduced into a disk type nodulizer similar to that described in U.S. Patent 2,995,436. The rougly spherical nodules produced by the action of the nodulizer contained about 13% by weight of water and when first produced were moist in appearance but within a short period of time became dry to the eye and the touch. The nodules were stored for some time prior to defluorination without appreciable change in the water content thereof, the nodules then being introduced into a fluidized bed reactor where they were heated in the presence of water vapor at a temperature of about 2468° F. to produce a defluorinated phosphate product containing about 0.15% by weight of fluorine.

Example III

Coarse beneficiated phosphate rock and the preferred amount of 48% $P_2O_5$ wet process phosphoric acid were fed into one end of pug mill where thorough blending of the rock-and-acid mix occurred as the mix was worked through the mill. About midway of the pug mill the preferred amount of soda ash was added to the pasty rock-and-acid mix, and blending of the three components was completed as the mix was worked to the pug mill discharge. Retention time for the first phase of the blending operation was approximately 4 minutes and retention time for the second blending phase was about 6 to 8 minutes. The acid introduced into the pug mill was heated to a temperature of 120–180° F., the use of heated acid increasing the reaction rate of the acid with the rock and soda ash and thereby allowing shorter retention time in the blender. The final agglomeration mixture contained between about 12 to 15% by weight of water, and the average composition of the mixture on a dry basis was as follows:

|   | Percent |
|---|---|
| Phosphate rock | 83.6 |
| Added $P_2O_5$ | 9.8 |
| Added $Na_2O$ | 6.6 |
|   | 100.0 |

The pug mill product was discharged directly into a rotary drum nodulizer 42 inches in diameter by 18 feet long, the mixture in the drum being heated by a gas burner directed countercurrent thereto. The exit temperature of the aglomerated product was between about 250 to 350° F., the use of heat promoting additional reaction between the three components which aids in the formation of satisfactory agglomerates in a relatively short drum. The dry-appearing finished product was screened to produce a minus 1″ plus ⅛″ fraction for rotary kiln feed, the undersize fraction being recycled to the pug mill. The defluorination feed fraction was introduced into a conventional 8 ft. by 180 ft. rotary kiln from which a defluorinated phosphate product was discharged, the agglomerates withstanding both the screening operation and the calcination operation without appreciable physical disintegration thereof.

Example IV

To an unground phosphate rock concentrate (having a particle size of between about minus 14 mesh and plus 150 mesh) was added about 10% by weight of a pluverized phosphate product (having a particle size of less than about 150 mesh), the resulting phosphate material then being formed into agglomerates by the procedure described in Example III. The non-hygroscopic aggomlerates thus prepared were readily defluorinated by calcination in a rotary kiln without significant physical disintegration of the agglomerates.

From the foregoing description of our new process for making strong, non-hygroscopic agglomerates of fluorine-containing phosphate material, it will be seen that we have made an important contribution to the art to which our invention relates.

We claim:
1. A method of forming agglomerates of a mixture of a fluorine containing phosphate rock having a silica content from 2% to 6% by weight, an acid phosphate compound selected from the group consisting of phosphoric acids and their acid sodium salts and a sodium compound selected from the group consisting of sodium carbonate, sodium bicarbonate, sodium hydroxide, sodium phosphates, sodium chloride, sodium sulfate and sodium nitrate, suitable for use as a defluorinated feed material, said method comprising:
   (a) adding to fluorine containing phosphate rock at least one of said acid phosphate compounds, the amount of the added acid phosphate compound (calculated as $P_2O_5$) being about 7% to 13% by weight on a dry basis of the final agglomeration mixture,
   (b) blending the phosphate rock and the acid phosphate compound together with sufficient water for a sufficient time to obtain a pastry reaction mix,
   (c) adding to the pastry reaction mix at least one of said sodium compounds, the amount of the added sodium compound (calculated at $Na_2O$) being between about 5% to 9% by weight on a dry basis of the final agglomerate mixture,
   (d) blending the phosphate rock acid phosphate compound and sodium compound together to obtain a substantially homogeneous mixture,
   (e) adjusting the moisture content of the homogeneous mixture so that the final agglomeration mixture contains from about 5% to 18% by weight of water, and
   (f) agglomerating said final agglomeration mixture forming nonhygroscopic agglomerates capable of being stored indefinitely, having sufficient mechanical strength to be screened and to withstand calcination in a rotary kiln without appreciable physical disintegration, and being capable of defluorination by heating in the presence of water vapor without fusion at a temperature of at least 2200° F.

2. A method of forming agglomerates according to claim 1 wherein the amount of the added phosphoric compound (calculated as $P_2O_5$) is between about 9% to 11% by weight on a dry basis of the final agglomeration mixtures, said acid phosphate compound is wet process phosphoric acid containing at least 32% $P_2O_5$ and the amount of added sodium compound is between about 6% to 7% by weight on a dry basis of the final agglomeration mixtures, said sodium compound is commercial sodium carbonate containing about 58% $Na_2O$.

References Cited by the Examiner
UNITED STATES PATENTS

| 2,995,436 | 8/61 | Hollingsworth | 71—44 |
| 2,997,367 | 8/61 | Williams | 71—44 |
| 3,058,804 | 10/52 | Tyran | 71—45 |
| 3,078,156 | 2/63 | Yamaguchi | 71—44 |
| 3,101,999 | 8/63 | Malley et al. | 71—44 |

DONALL H. SYLVESTER, *Primary Examiner.*
ANTHONY SCIAMANNA, *Examiner.*

UNITED STATES PATENT OFFICE
CERTIFICATE OF CORRECTION

Patent No. 3,189,433                                                              June 15, 19( Clinton A. Hollingsworth et al.

It is hereby certified that error appears in the above numbered patent requiring correction and that the said Letters Patent should read as corrected below.

Column 1, line 53, for "adidtion" read -- addition --; column 2, line 37, for "ramoval" read -- removal --; column 4 line 51, for "Fuorine" read -- Fluorine --; line 54, for "Deflpuination" read -- Defluorination --; column 5, line 33, for "aglomerated" read -- agglomerated --; line 50, for "pluv ized" read -- pulverized --; column 6, lines 20 and 21, for "pastry", each occurrence, read -- pasty --; same column 6, line 56, for "10/52" read -- 10/62 --.

Signed and sealed this 16th day of November 1965.

(SEAL)
Attest:

ERNEST W. SWIDER                                    EDWARD J. BRENNER
Attesting Officer                                        Commissioner of Patents